(No Model.) 2 Sheets—Sheet 2.

G. H. HURLBUT.
MAGAZINE PHOTOGRAPHIC CAMERA.

No. 462,842. Patented Nov. 10, 1891.

Witnesses:
E. Behel.
L. L. Miller.

Inventor:
George H. Hurlbut
By A. O. Behel
Atty

UNITED STATES PATENT OFFICE.

GEORGE H. HURLBUT, OF BELVIDERE, ILLINOIS.

MAGAZINE PHOTOGRAPHIC CAMERA.

SPECIFICATION forming part of Letters Patent No. 462,842, dated November 10, 1891.

Application filed April 4, 1891. Serial No. 387,690. (No model.)

*To all whom it may concern:*

Be it known that I, GEORGE H. HURLBUT, a citizen of the United States, residing at Belvidere, in the county of Boone and State of Illinois, have invented certain new and useful Improvements in Cameras, of which the following is a specification.

This invention relates to photographic cameras; and it consists, essentially, of a removable-plate magazine, the object being to make it possible for the operator in any place or at any time to remove the exposed plate and place new ones in position to be operated upon without being obliged to have recourse to a dark-room or waiting until night-time.

Figure 1:
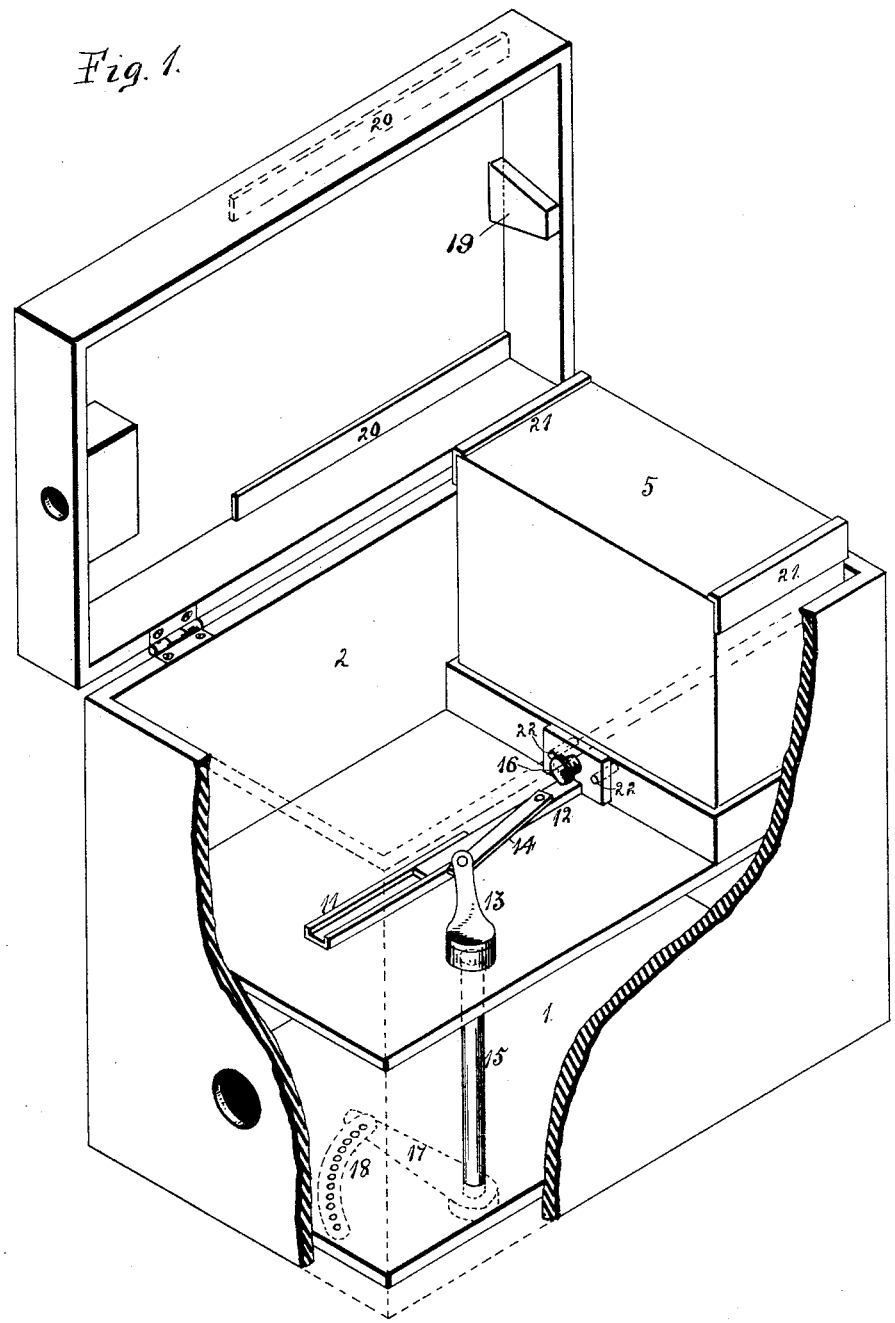
Figure 2:
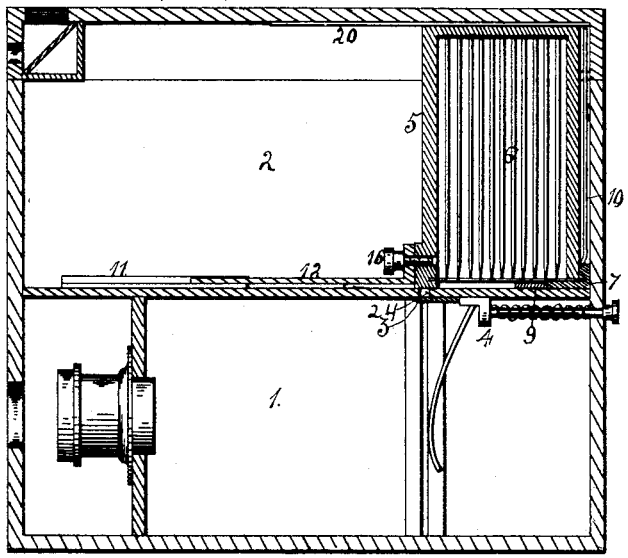
Figure 3:
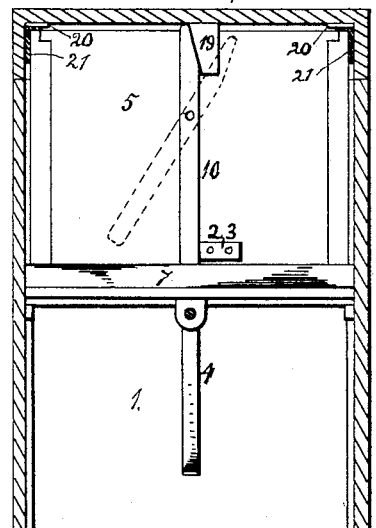
Figure 4:
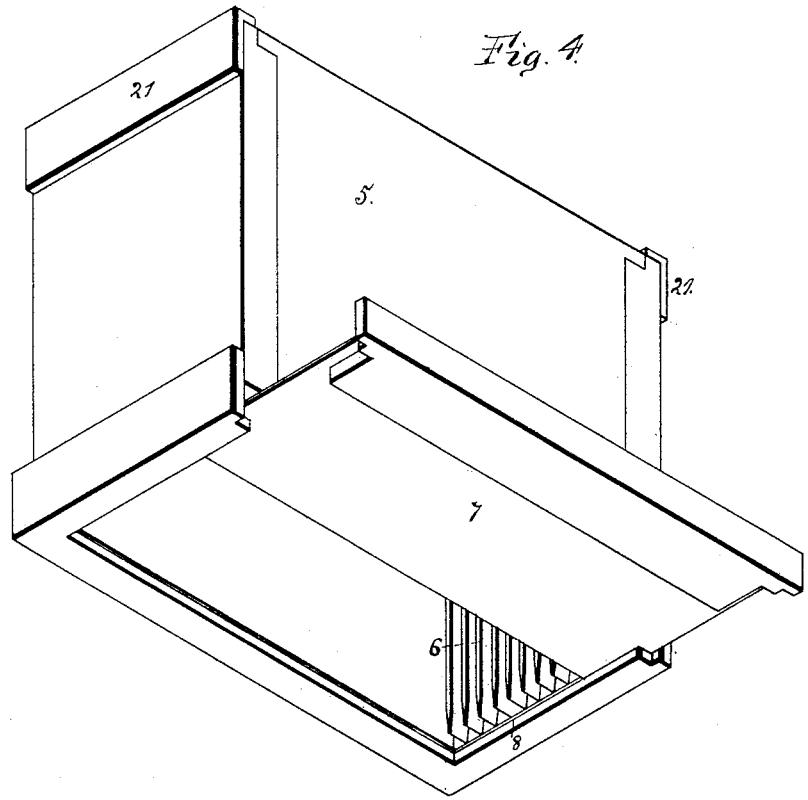

In the accompanying drawings, Figure 1 is an isometrical view exhibiting the application of my removable-plate magazine to a camera. Fig. 2 is a longitudinal section on dotted line $a$, Fig. 1, of the camera, to which any removable magazine is attached. Fig. 3 is an end elevation of camera-box broken away to show mode of attaching the magazine. Fig. 4 is an isometrical view of the plate-magazine removed from the camera.

The camera to which this magazine is most readily attached is one divided into two compartments, one above the other, the lower one 1 for containing the lens, the shutter, and the plate to be exposed, while the upper compartment 2 holds the plates before and after exposure, the two chambers communicating with each other by an opening 3, through which the plates pass, and this passage is closed by means of a spring-slide 4 when the plates are not being shifted from the magazine to the camera proper, or vice versa. In this upper compartment I have placed a light-tight magazine 5, containing racks 6 for several plates, the cover 7 of which slides in grooves 8 in the ends of the magazine 5. The magazine filled with plates is placed bottom up in the upper compartment of the camera-box, and the sliding cover of the magazine is located so that its thick portion rests against the block 9, which engages the front of the cover and prevents its movement in the direction of the movement of the magazine proper, and a lever 10 rests upon the edge of the cover, which holds it from displacement when the box is turned over. Sliding in ways 11 in the opposite end of this upper compartment of the camera-box is an arm 12, which is movable in the lengthwise direction of the box. This sliding arm 12 is connected by a link 14 with the crank 13, and said crank is rigidly attached to the upper end of the shaft 15. The main portion of the magazine has a detachable connection with the sliding arm 12 by means of a thumb-screw 16, passing through the upturned end of the arm into the side of the magazine.

The passage 24, communicating with the lower compartment of the camera-box, is located directly in front of the plate-magazine, and it is evident that by moving the magazine forward by means of the reciprocating arm, the sliding cover of the magazine being secured to the camera-box, each of the plates within the magazine will be brought in turn over the passage to the lower compartment of the camera-box, and into which they may be dropped by pulling back the slide 3 which covers this opening. After the exposure of each plate the camera is turned bottom up, and by pulling back the slide which covers the passage between the two compartments the plate drops back into its place in the rack in the magazine. The shaft, being again rotated the required distance by the operator, moves the magazine forward and brings another plate over the passage to the lower compartment, and by again pulling the slide covering the passage another plate drops into the lower compartment in position for exposure. This operation is repeated for each plate until all have been exposed and the last one dropped into its place in the magazine. Then, still retaining the box in its inverted position, the shaft is rotated in the opposite direction, sliding the magazine back onto its cover. The camera-box may then be opened, and by unscrewing the thumb-screw 16 and throwing back the lever 10, which clamps the cover of the magazine to the camera-box, the magazine may be detached and removed and another magazine containing a supply of unexposed plates substituted. It will thus be seen that the operator is limited in the number of exposures only by his supply of plates without resorting to the usual dark-room or waiting night-fall to remove them from the camera.

On the lower end of the magazine-operating shaft 15 is attached a crank 17, extending from the under side of which is a peg, which enters holes on a dial 18, over which it passes, the holes being so located in reference to the position of the plate-magazine that each hole represents a plate-rack in the magazine, and when the peg is in a hole in the dial the rack in the plate-magazine corresponding to it is directly over the passage between the upper and the lower chambers. Thus by reference to this dial the number of plates exposed and the number yet unexposed may be readily ascertained.

That the lever which locks the cover of the plate-magazine to the camera-box may not accidentally be displaced, its upper end is beveled on the side toward the hinges connecting the cover to the box, and within the cover is a wedge-shaped projection 19, which when the box is closed strikes against the slanting side of the lever and forces it into position against a stop 23, secured to the end of the camera-box. On the under side of the cover of the camera-box are two metallic strips 20, forming ways or bearings for two similar pieces 21, secured to the bottom of the plate-magazine.

That the thumb-screw 16 may readily enter its thread in the body of the plate-magazine, I provide two projections 22, extending from the lever 12, which enter holes in the magazine, thus centering the thumb-screw.

It will be seen that the magazine is free from projections, and a number of them can be easily carried in a grip.

I claim as my invention—

1. A removable plate-magazine for cameras, comprising a light-tight compartment containing racks for plates, a sliding cover for said compartment, means for securing the cover to the camera-box, and a longitudinally-sliding arm attached to said magazine for moving the said plate-racks into coincidence with the passage into the exposing-chamber of the camera-box.

2. A removable plate-magazine for cameras, comprising a light-tight compartment containing racks for plates, a sliding cover for said compartment, a lever for securing said cover to the camera-box, and a longitudinally-sliding arm attached to said magazine for moving the said plate-racks into coincidence with the passage into the exposing-chamber of the camera-box.

3. A removable plate-magazine for cameras, comprising a light-tight compartment, racks in said compartment for plates, a sliding cover for said compartment, a lever for securing said cover to the camera-box, a reciprocating arm for moving said plate-racks into coincidence with the passage to the exposing-chamber, and a thumb-screw for attaching said arm to said compartments.

GEORGE H. HURLBUT.

Witnesses:
   A. O. BEHEL,
   L. L. MILLER.